United States Patent
Liu et al.

(10) Patent No.: US 12,450,155 B1
(45) Date of Patent: Oct. 21, 2025

(54) MEMORY DEVICE AND MEMORY CONTROL CIRCUIT

(71) Applicant: MACRONIX INTERNATIONAL CO., LTD., Hsinchu (TW)

(72) Inventors: Ting-Yu Liu, Hsinchu (TW); Chi-Yu Chen, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 18/642,936

(22) Filed: Apr. 23, 2024

(51) Int. Cl.
*G06F 12/02* (2006.01)

(52) U.S. Cl.
CPC ...... *G06F 12/0246* (2013.01); *G06F 12/0292* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 11,614,876 B2* | 3/2023 | Chen | ............... | G06F 3/0679 711/103 |
| 2014/0208062 A1* | 7/2014 | Cohen | ............... | G06F 3/0688 711/206 |
| 2014/0325117 A1* | 10/2014 | Canepa | ............... | G06F 12/0246 711/103 |
| 2016/0098355 A1* | 4/2016 | Gorobets | ............... | G06F 12/0246 711/203 |
| 2016/0342509 A1* | 11/2016 | Kotte | ............... | G06F 12/0246 |
| 2017/0286287 A1* | 10/2017 | Hady | ............... | G06F 12/0246 |
| 2018/0239697 A1* | 8/2018 | Huang | ............... | G06F 12/0246 |
| 2020/0133849 A1* | 4/2020 | Harris | ............... | G06F 12/0246 |
| 2021/0011859 A1* | 1/2021 | Li | ............... | G06F 12/0246 |
| 2022/0269440 A1* | 8/2022 | Lin | ............... | G06F 3/0604 |
| 2023/0152973 A1* | 5/2023 | Hwang | ............... | G06F 3/0679 711/103 |

(Continued)

FOREIGN PATENT DOCUMENTS

TW  I874200 B  *  2/2025  ............ G06F 12/10

OTHER PUBLICATIONS

Kim et al. "A Space-Efficient Flash Translation Layer for CompactFlash Systems." May 2002. IEEE. IEEE Transactions on Consumer Electronics. vol. 48. pp. 366-375.*

*Primary Examiner* — Nathan Sadler
(74) *Attorney, Agent, or Firm* — McClure, Qualey & Rodack, LLP

(57) ABSTRACT

A memory device and a memory control circuit are provided. The memory control circuit is used to control a memory cell array. A processing circuit of the memory control circuit is configured to obtain a mapping group identification according to a namespace identification and a logical address through a namespace-table. The processing circuit is configured to obtain a block group identification and a mapping entry through a logical-to-virtual-mapping-table according to the mapping group identification and the offset of the logical address in the mapping group identification. The processing circuit is configured to obtain a super block identification according to the block group identification and the virtual block number through a virtual-to-physical-block-table. The processing circuit is configured to obtain a physical block number according to the super block identification, a channel, a die and a plane through the virtual-to-physical-block-table.

20 Claims, 20 Drawing Sheets

(56) References Cited

U.S. PATENT DOCUMENTS

| | | | |
|---|---|---|---|
| 2024/0094928 A1* | 3/2024 | Das | G06F 12/0246 |
| 2024/0095165 A1* | 3/2024 | Benisty | G06F 12/1027 |
| 2024/0095182 A1* | 3/2024 | Tadokoro | G06F 3/0644 |

* cited by examiner

L2VMT

| MGID | Mapping entries ME | |
|---|---|---|
| [0] | [0] | |
| | ⋮ | ⋮ |
| | [524287] | |
| [1] | [0] | |
| | ⋮ | ⋮ |
| | [524287] | |
| [2] | [0] | |
| | ⋮ | ⋮ |
| | [524287] | |
| ⋮ | ⋮ | |

VA

AR0: 16TB, BGID:0-1
- CH: 4 bits
- DE: 3 bits
- PL: 2 bits
- VBN: 8 bits
- PG: 13 bits
- CK: 2 bits AR0: 32TB, BGID:0-3
- CH: 4 bits
- DE: 4 bits
- PL: 2 bits
- VBN: 7 bits
- PG: 13 bits
- CK: 2 bits

FIG. 4

NST

| NSID | (Start index SI, Count CT) |
|---|---|
| [0] | N/A |
| [1] | (0, 4) |
| [2] | Not created |
| [3] | (4, 3) |
| [4] | Not created |
| [5] | Not created |
| [6] | (7, 2) |
| ⋮ | ⋮ |

| Index IX | MGID |
|---|---|
| [0] | 0 |
| [1] | 1 |
| [2] | 2 |
| [3] | 3 |
| [4] | 10 |
| [5] | 11 |
| [6] | 4 |
| [7] | 5 |
| [8] | 9 |
| ⋮ | ⋮ |

FIG. 6

V2PBT

| BGID | VBN | SBID |
|---|---|---|
| 0 | 0 | 2 |
| | ... | ... |
| | 255 | 511 |
| 1 | 0 | 1 |
| | ... | ... |
| | 255 | 300 |

(5)

| SBID | ST | EC | Physical Block Number PBN | | | | | | VC |
|---|---|---|---|---|---|---|---|---|---|
| 0 | Free | 50 | 0 | 0 | 1 | ... | 0 | 0 |
| 1 | Used | 51 | 1 | 3 | 2 | ... | 1 | 534 |
| 2 | Used | 34 | 2 | 4 | 3 | ... | 2 | 1283 |
| ... | ... | ... | ... | ... | ... | ... | ... | ... |
| 300 | Used Free | 100 | 301 | 299 | 321 | ... | 321 | 0 |
| ... | ... | ... | ... | ... | ... | ... | ... | ... |
| 511 | Used | 87 | 0 | 500 | 510 | ... | 511 | 666 |

PO

| SBID | 12 | 25 | 56 | 243 | 345 | 300 |
|---|---|---|---|---|---|---|
| Erase count EC | 17 | 15 | 89 | 19 | 22 | 100 |

MEMORY DEVICE AND MEMORY CONTROL CIRCUIT

TECHNICAL FIELD

The disclosure relates in general to an electronic device and a control circuit, and more particularly to a memory device and a memory control circuit.

BACKGROUND

For a memory cell array with a capacity of 8 TB, 32-bit addressing technology can currently be used to define the address of a 4 KB block. However, for a memory cell array with a capacity of 16 TB (or higher), the number of addressing bits must be increased and cannot be maintained at 32 bits.

Although the endurance group addressing technology has been developed to maintain the amount of addressed data at 32 bits. However, the endurance group addressing technology will cause the problem of writing efficiency being halved (or even lower). For example, suppose we have two endurance groups, each write on a group will only utilize the half of channel since the write between group can not interfere with each other. Therefore, researchers are working hard to develop a new addressing technology that aims to enable memory cell arrays with a capacity of 16 TB (or higher) to still use 32 bits for addressing and maintain write efficiency.

SUMMARY

The disclosure is directed to a memory device and a memory control circuit. Through the operation of a namespace-table, a logical-to-virtual-mapping-table and a virtual-to-physical-block-table, a memory cell array with a capacity of 16 TB (or higher) could use a 32-bit virtual address without increasing the number of addressing bits or reducing writing efficiency.

According to one embodiment, a memory control circuit is provided. The memory control circuit is used for controlling a memory cell array. The memory control circuit includes a storage unit and a processing circuit. The storage unit is used for storing a namespace-table, a logical-to-virtual-mapping-table and a virtual-to-physical-block-table. The processing circuit is connected to the storage unit. The processing circuit is configured to obtain a mapping group identification according to a namespace identification and a logical address through the namespace-table; obtain a block group identification and a mapping entry according to the mapping group identification and an offset of the logical address in the mapping group identification through the logical-to-virtual-mapping-table; obtain a super block identification according to the block group identification and a virtual block number through a virtual-to-physical-block-table; and obtain a physical block number through the virtual-to-physical-block-table.

According to another embodiment, a memory control circuit is provided. The memory control circuit is used for controlling a memory cell array. The memory control circuit includes a storage unit and a processing circuit. The storage unit is configured to store a namespace-table, a logical-to-virtual-mapping-table and a virtual-to-physical-block-table. The processing circuit is connected to the storage unit. The processing circuit is configured to obtain a mapping group identification according to a namespace identification and a logical address through the namespace-table; obtain a block group identification and a mapping entry according to the mapping group identification and an offset of the logical address in the mapping group identification through the logical-to-virtual-mapping-table; obtain a physical block number through the virtual-to-physical-block-table.

According to an alternative embodiment, a memory device is provided. The memory device includes a memory cell array and a memory control circuit. The memory control circuit is used for controlling the memory cell array. The memory control circuit includes a storage unit and a processing circuit. The storage unit is configured to store a namespace-table, a logical-to-virtual-mapping-table and a virtual-to-physical-block-table. The processing circuit is connected to the storage unit. The processing circuit is configured to obtain a mapping group identification according to a namespace identification and a logical address through the namespace-table; obtain a block group identification and a mapping entry according to the mapping group identification and an offset of the logical address in the mapping group identification through the logical-to-virtual-mapping-table; obtain a super block identification according to the block group identification and a virtual block number through the virtual-to-physical-block-table; obtain a physical block number through the virtual-to-physical-block-table.

BRIEF DESCRIPTION OF THE DRAWINGS

FIG. 4 illustrates a schematic diagram of a logical-to-virtual-mapping-table L2VMT according to an embodiment of the present disclosure.

FIG. 6 illustrates the namespace-table NST according to an embodiment of the present disclosure.

FIG. 18 illustrates the application of the namespace-table NST and the virtual-to-physical-block-table V2PBT during the garbage collection.

Figure 1:
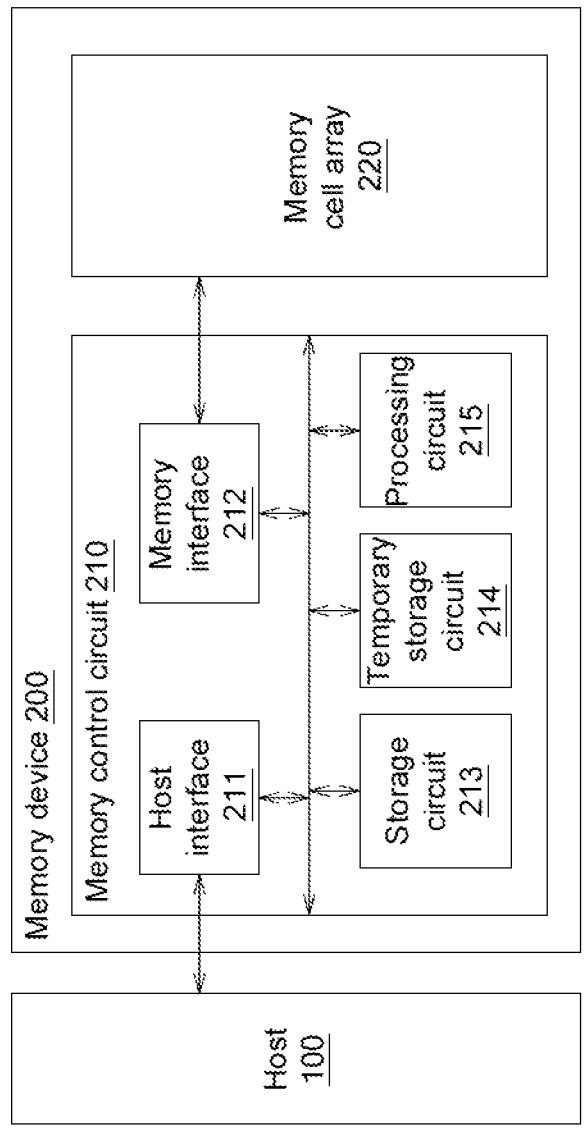
FIG. 1 illustrates a schematic diagram of a memory device 200 and a host 100 according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please refer to FIG. 1, which illustrates a schematic diagram of a memory device 200 and a host 100 according to an embodiment. The memory device 200 is connected to the host 100. The memory device 200 includes a memory control circuit 210 and a memory cell array 220. The memory control circuit 210 includes a storage unit, including a storage circuit 213 and a temporary storage circuit 214, a processing circuit 215, a host interface 211 and a memory interface 212.

The storage circuit 213 (or the temporary storage circuit 214) is used to store the data used to manage the memory cell array 220. The storage circuit 213 is, for example, a Dynamic Random Access Memory (DRAM). The temporary storage circuit 214 (or the storage circuit 213) is used to temporarily store the data to be read or written. The temporary storage circuit 214 is, for example, a Static Random Access Memory (SRAM). The host interface 211 is used to communicate with the host 100. The memory interface 212 is used to communicate with the memory cell array 220. The memory control circuit 210 is used to control the memory cell array 220 to perform a read operation, a write operation, a garbage collection, or the error correction.

Figure 2:
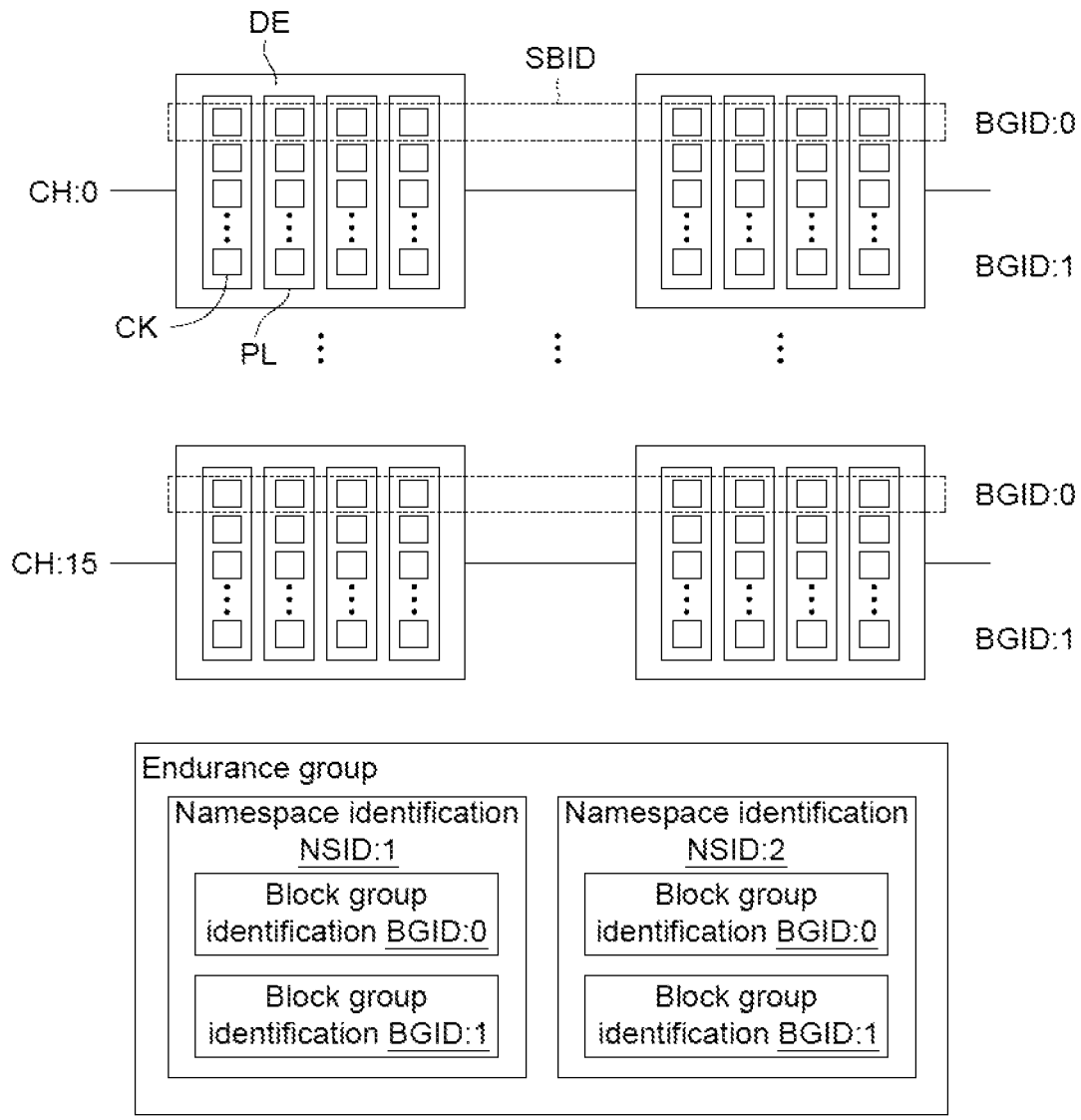
FIG. 2 illustrates a system diagram of a memory cell array 220 according to an embodiment of the present disclosure.

Please refer to FIG. 2, which illustrates a system diagram of the memory cell array 220 according to an embodiment of the present disclosure. In this embodiment, an Endurance group includes, for example, a namespace identification NSID with coding numbers "1" and "2" (The present disclosure is not limited to this). For example, the coding number "1" for the namespace identification NSID maps to the coding numbers "0" and "1" for a block group identification BGID (The present disclosure is not limited to this). The coding number "2" for the namespace identification NSID maps to the coding numbers "0" and "1" for the block group identification BGID (The present disclosure is not limited to this).

One super block identification SBID consists of physical blocks from each plane of the memory cell array 220. Each channel CH includes a plurality of dies DE, and each of the dies DE includes a plurality of planes PL. Each of the planes PL includes a plurality of blocks BLKs. Each of the block group identification BGID could obtain the maximum write bandwidth in the namespace identification NSID.

Figure 3:
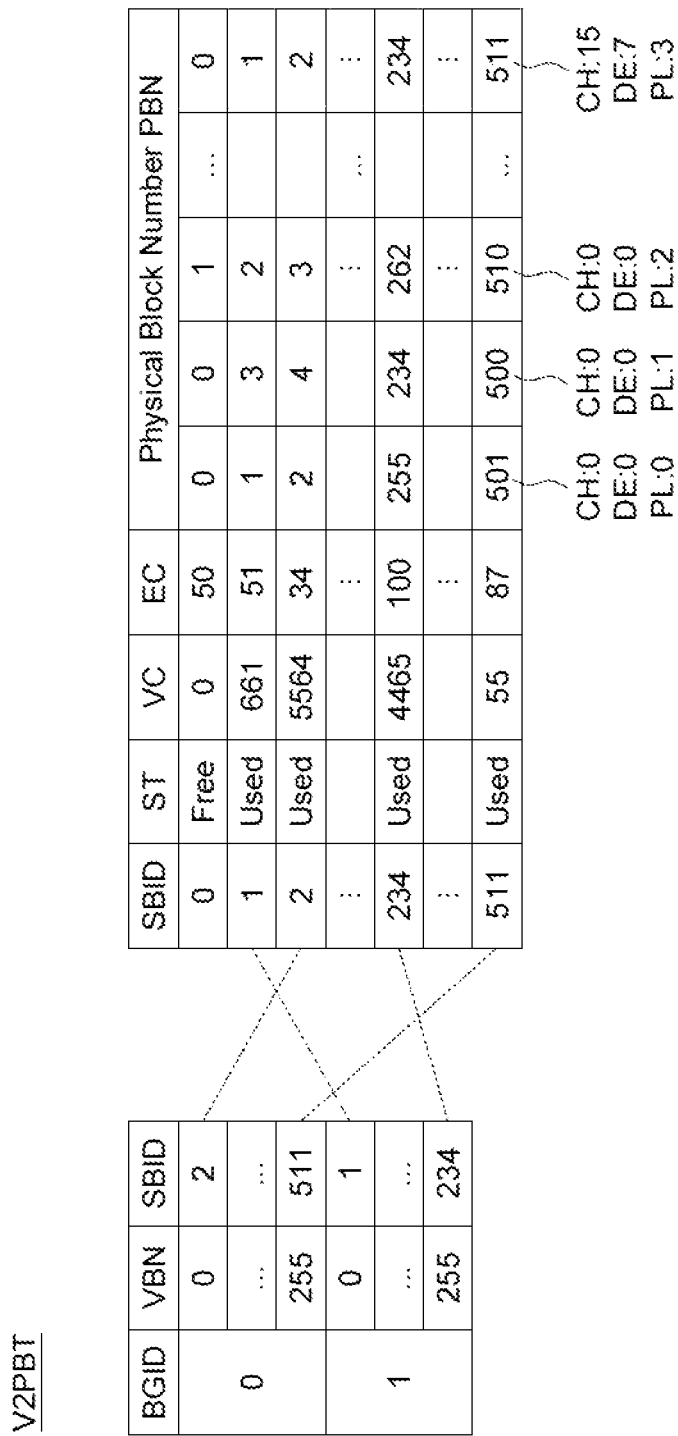
FIG. 3 illustrates a schematic diagram of a virtual-to-physical-block-table V2PBT according to an embodiment of the present disclosure.

Please refer to FIG. 3, which illustrates a schematic diagram of a virtual-to-physical-block-table V2PBT according to an embodiment of the present disclosure. In the virtual-to-physical-block-table V2PBT, a coding number for the block group identification BGID maps to a plurality of coding numbers for the virtual block number VBN. For example, a coding number "0" for the block group identification BGID maps to the coding numbers "0" to "255" for the virtual block number VBN; a coding number "1" for the block group identification BGID also maps to the coding numbers "0" to "255" for the virtual block number VBN.

Each of the virtual block number VBN maps to a coding number for the super block identification SBID. For example, in the coding number "0" for the block group identification BGID, the coding number "0" for the virtual block number VBN maps to the coding number "2" for the super block identification SBID; in the coding number "0" for the block group identification BGID, the coding number "255" for the virtual block number VBN maps to the coding number "511" for the super block identification SBID; in the coding number "1" for the block group identification BGID, the coding number "0" for the virtual block number VBN maps to the coding number "1" for the super block identification SBID; in the coding number "1" for the block group identification BGID, the coding number "255" for the virtual block number VBN maps to the coding number "234" for the super block identification SBID.

In the coding number "0" for the block group identification BGID and the coding number "1" for the block group identification BGID, the coding numbers for the super block identification SBID are "0" to "511".

Each of the coding numbers for the super block identification SBID maps to the plurality of physical block numbers PBN in different planes PL. For example, the coding number "0" for the super block identification SBID maps to the coding number "0" for the physical block number PBN in the coding number "0" for the channel CH, the coding number "0" for the die DE and the coding number "0" for the plane PL. The coding number "0" for the super block identification SBID maps to the coding number "0" for the physical block number PBN in the coding number "0" for the channel CH, the coding number "0" for the die DE and the coding number "1" for the plane PL.

Each of the coding number for the super block identification SBID records the state ST as "Free" or "Used". The state ST is used for the block configuration during the write operation or the garbage collection.

Each of the coding numbers for the super block identification SBID records the valid count VC and the erase count EC. The valid count VC and the erase count EC are used for the block configuration during the write operation or the garbage collection.

Through the design of the virtual-to-physical-block-table V2PBT, the above-mentioned processing circuit 215 could obtain the super block identification SBID according to the block group identification BGID and the virtual block number VBN through the virtual-to-physical-block-table V2PBT, and obtain the physical block number PBN according to the super block identification SBID, the channel CH, the die DE and the plane PL.

Please refer to FIG. 4, which illustrates a schematic diagram of a logical-to-virtual-mapping-table L2VMT according to an embodiment of the present disclosure. The logical-to-virtual-mapping-table L2VMT is divided into a plurality of coding numbers for the mapping group identification MGID. For example, each of the coding numbers for the mapping group identification MGID maps 2 GB of data, and each of the mapping entries ME is used to map 4 KB of data. In each of the coding numbers for the mapping group identification MGID, there are 524288 mapping entries ME.

In the logical-to-virtual-mapping-table L2VMT, the coding numbers for the mapping group identification MGID map to the coding numbers for the block group identification BGID in a round robin policy. For example, if the block group identification BGID has two coding numbers: "0" and "1", the even coding number for the mapping group identification MGID maps to the coding number "0" for the block group identification BGID, and the odd coding number for the mapping group identification MGID maps to the coding number "1" for the block group identification BGID. The round robin policy is just one example and is not used to limited this disclosure. For example, N continuous coding numbers for the mapping group identification MGID could be grouped into the same block group identification BGID.

Each of the mapping entries ME maps a set of 32-bit virtual address VA. The 32-bit virtual address VA is composed of the channel CH, the die DE, the plane PL, the virtual block number VBN, the page PG and the block BLK. In this embodiment, no matter how large the capacity of the memory cell array 220 is, the virtual address VA could be maintained at 32 bits. For example, if the capacity of the memory cell array 220 is 16 TB, the block group identification BGID has two coding numbers. In the virtual address VA, the coding number for the channel CH occupies 4 bits, the coding number for the die DE occupies 3 bits, the coding number for the plane PL occupies 2 bits, the coding number for the virtual block number VBN occupies 8 bits, the coding number for the page PG occupies 13 bits, and the coding number for the block BLK occupies 2 bits. If the capacity of the memory cell array 220 is 32 TB, the block group identification BGID has 4 coding numbers. In the virtual address VA, the coding number for the channel CH occupies 4 bits, the coding number for the die DE occupies 4 bits, the coding number for the plane PL occupies 2 bits, the coding number for the virtual block number VBN occupies 7 bits, the coding number for the page PG occupies 13 bits, and the coding number for the block BLK occupies 2 bits.

By analogy, the capacity of the memory cell array 220 is 8 TB or multiple of 8 TB, the number of the block group identification BGID is depended on the multiple of 8 TB. If the memory cell array has a capacity of $8*2^N$ TB (N is a natural number), and suppose in 8 TB need M bits for block addressing, then the virtual block number VBN occupies M-N bits.

Figure 5:
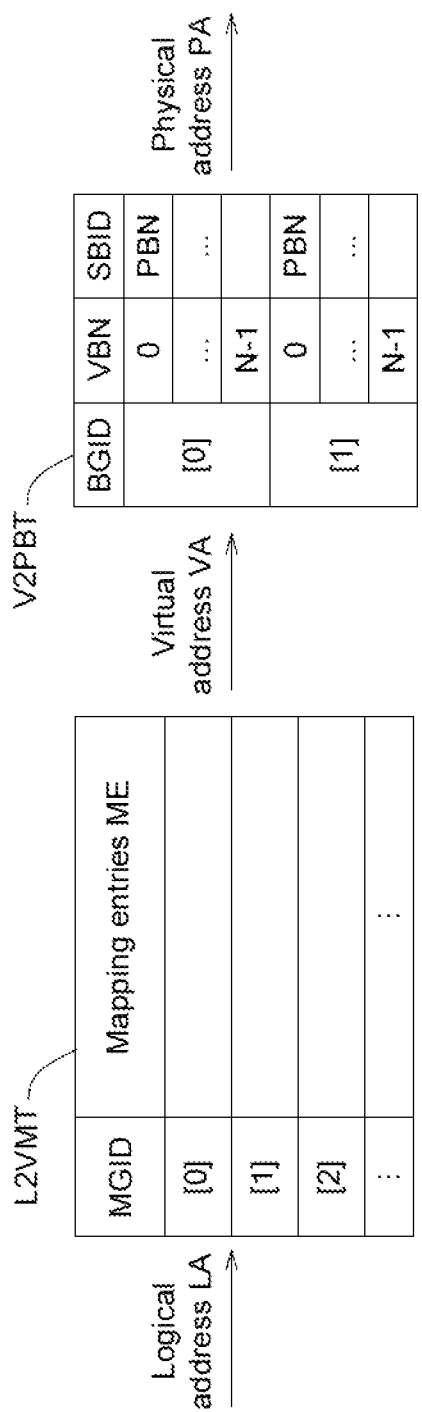
FIG. 5 illustrates the relationship between the logical-to-virtual-mapping-table L2VMT and the virtual-to-physical-block-table V2PBT.

Please refer to FIG. 5, which illustrates the relationship between the logical-to-virtual-mapping-table L2VMT and the virtual-to-physical-block-table V2PBT. Through the design of the logical-to-virtual-mapping-table L2VMT and the virtual-to-physical-block-table V2PBT, the above-mentioned processing circuit 215 could map the logical address LA to the virtual address VA through the logical-to-virtual-mapping-table L2VMT, and map the virtual address VA to the physical address PA through the virtual-to-physical-block-table V2PBT.

Please refer to FIG. 6, which illustrates the namespace-table NST according to an embodiment of the present disclosure. In the namespace-table NST, a coding number for the namespace identification NSID maps to one or more coding numbers for the mapping group identification MGID. Each of the coding number for the mapping group identification MGID maps to 2 GB of data. For example, in the namespace-table NST, the start index SI and the count CT mapped to the coding number "1" for the namespace identification NSID are 0 and 4 respectively, so the indexes IX mapped to the coding number "1" for the namespace identification NSID are "0", "1", "2", "3" (i.e., the coding numbers "0", "1", "2", "3" for the mapping group identification MGID). The start index SI and the count CT mapped to the coding number "3" for the namespace identification NSID are 4 and 3 respectively, so the indexes IX mapped to the coding number "3" for the namespace identification NSID are "4", "5", "6" (i.e., the coding numbers "10", "11", "4" for the mapping group identification MGID). The start index SI and the count CT mapped to the coding number "6" for the namespace identification NSID are 7 and 2 respectively, so the indexes IX mapped to the coding number "6" for the namespace identification NSID is "7", "8" (i.e. the coding numbers "5", "9" for the mapping group identification MGID).

One coding number for the mapping group identification MGID maps to one coding number for the block group identification BGID (shown in the FIG. 5).

Through the design of the namespace-table NST, the logical-to-virtual-mapping-table L2VMT and the virtual-to-physical-block-table V2PBT, the memory cell array 220 with a capacity of 16 TB (or higher) could still use 32 bits for addressing, and the write efficiency could be maintained.

In addition, one super block identification SBID consists of physical blocks from each plane of the memory cell array 220. The memory cell array 220 could support global wear leveling.

Figure 7:
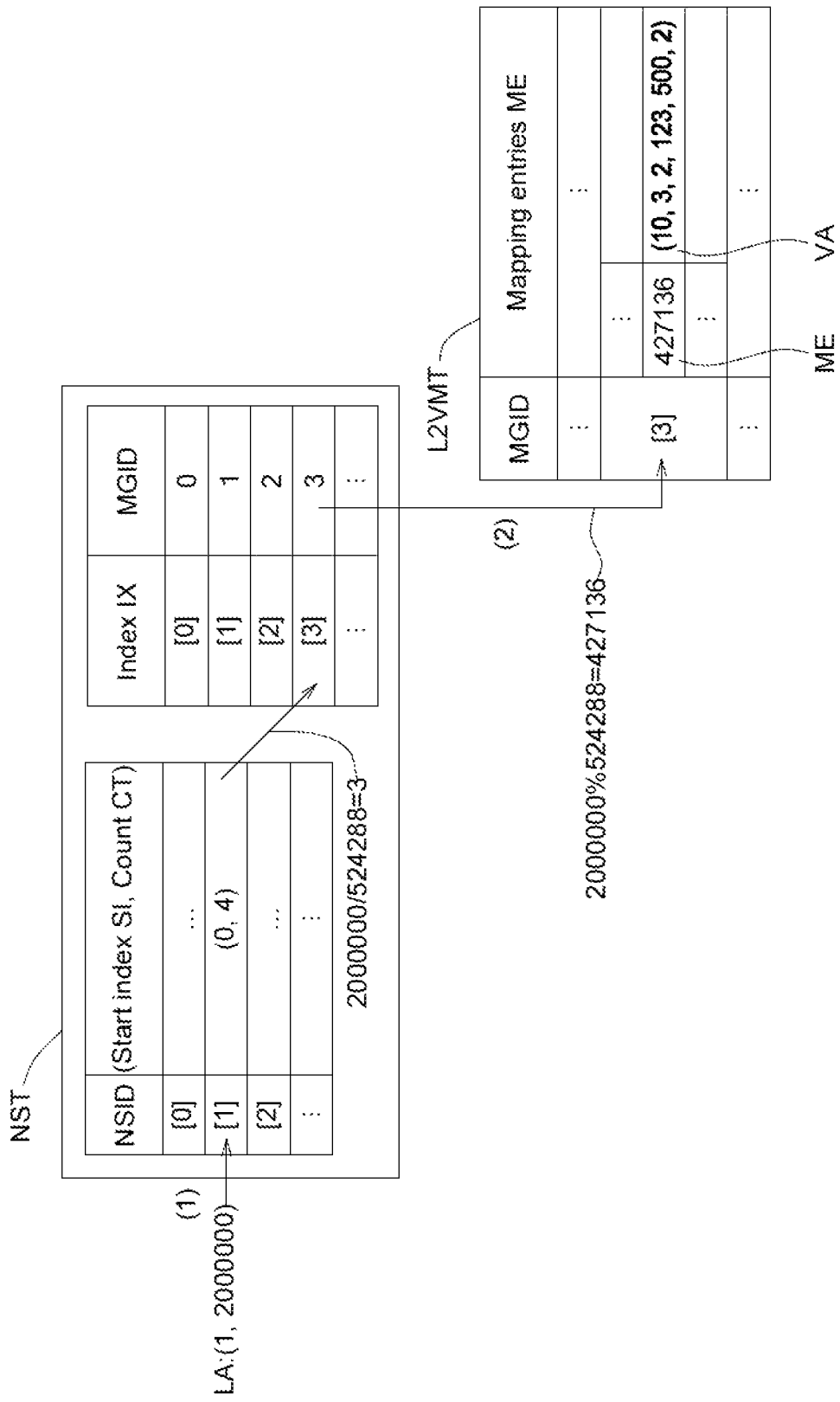
FIG. 7 illustrates the conversion of the namespace-table NST and the logical-to-virtual-mapping-table L2VMT during the read operation.
Figure 8:
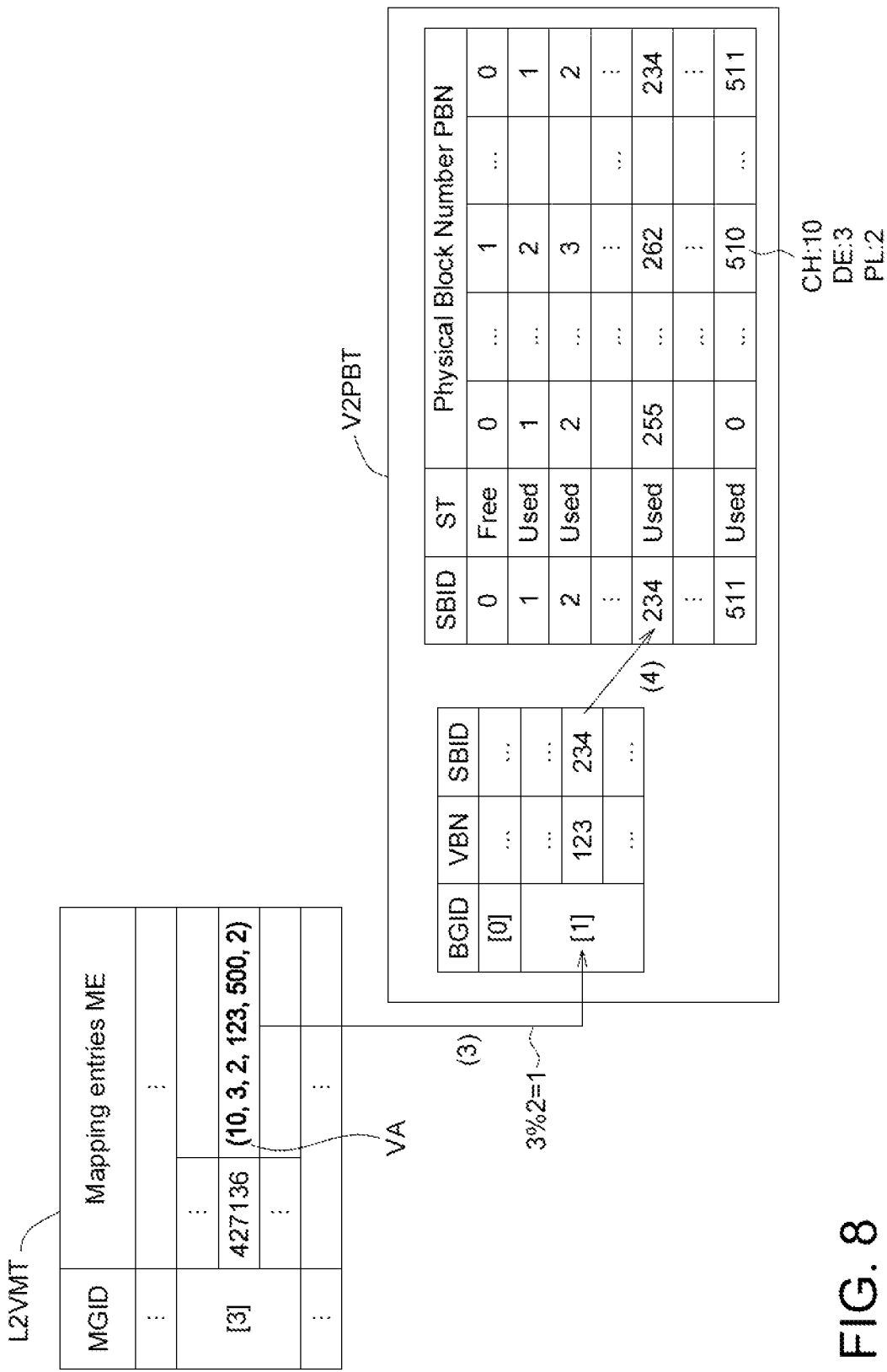
FIG. 8 illustrates the conversion of the logical-to-virtual-mapping-table L2VMT and the virtual-to-physical-block-table V2PBT during the read operation.
Figure 9:
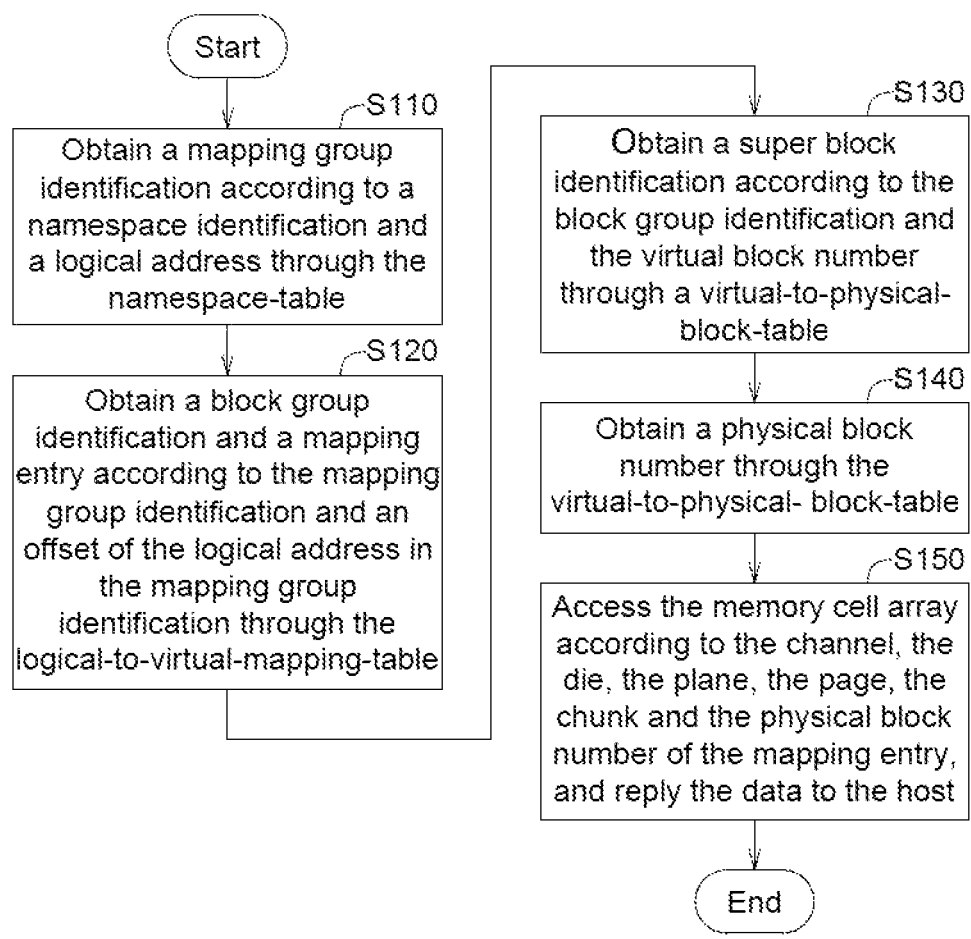
FIG. 9 illustrates a flow chart of the reading operation according to an embodiment of the present disclosure.

In order to explain the technology of the present disclosure more clearly, the read operation, the write operation and the garbage collection are described in detail below respectively. FIGS. 7 to 9 are used to illustrate the read operation. FIGS. 10 to 14 are used to illustrate the write operation. FIGS. 15 to 19 are used to illustrate the garbage collection.

Please refer to FIG. 7, which illustrates the conversion of the namespace-table NST and the logical-to-virtual-mapping-table L2VMT during the read operation. In the example in FIG. 7, each of the coding numbers for the mapping group identification MGID maps to 524288 mapping entries ME, and maps to two coding numbers for the block group identification BGID.

The following is an example of reading data whose coding number for the namespace identification NSID is "1" and the logical address LA is "2000000". Refer to the mark (1) in FIG. 7. In the namespace-table NST, the start index SI and the count CT mapped to the coding number "1" for the namespace identification NSID are 0 and 4 respectively. The indexes IX mapped to the coding number "1" for the namespace identification NSID are "0", "1", "2", "3" (i.e. the coding numbers "0", "1", "2" "3" for the mapping group identification MGID).

Each of the coding numbers for the mapping group identification MGID maps to 524288 mapping entries ME. The logical address LA is "2000000". After the division operation of 2000000/524288, the quotient of "3" could be obtained. In other words, the logical address LA of "2000000" maps to the fourth coding number for the mapping group identification MGID (that is, the coding number "3" for the mapping group identification MGID).

Then, refer to the mark (2) in FIG. 7. The logical address LA is "2000000". Through the modulus operation (MOD) of 2000000% 524288, "427136" could be obtained. In other words, the logical address LA of "2000000" maps to the 427136th mapping entry ME in coding number "3" for the mapping group identification MGID.

Then, please refer to FIG. 8, which illustrates the conversion of the logical-to-virtual-mapping-table L2VMT and the virtual-to-physical-block-table V2PBT during the read operation. Refer to the mark (3) in FIG. 8. The coding number "3" for the mapping group identification MGID is obtained. Through the modulus operation of 3% 2, "1" can be obtained. In other words, the coding number "3" for the mapping group identification MGID corresponds to the coding number "1" for the block group identification BGID.

The 427136th mapping entry ME in the coding number "3" for the mapping group identification MGID maps to the virtual address VA of "(10, 3, 2, 123, 500, 2)". In the virtual address VA of "(10, 3, 2, 123, 500, 2)", the coding number for the channel CH is "10", the coding number for the die DE is "3", the coding number for the plane PL is "2", and the coding number for the virtual block number VBN is "123". Through the virtual-to-physical-block-table V2PBT, the coding number "1" for the block group identification BGID and the coding number "123" for the virtual block number VBN map to the coding number "234" for the super block identification SBID.

Then, refer to the mark (4) in FIG. 8. Through the virtual-to-physical-block-table V2PBT, the coding number "10" for the channel CH, the coding number "3" for the die DE, the coding number "2" for the plane PL, the coding number "234" for the super block identification SBID map to the coding number "262" for the physical block number PBN.

According to the above description, through the technology of the present disclosure, during the read operation of the memory cell array 220 with a capacity of 16 TB (or higher), 32 bits can still be used for addressing without increasing the addressing bits. The following uses a flow chart to illustrate the reading operation of the present disclosure.

Please refer to FIG. 9, which illustrates a flow chart of the reading operation according to an embodiment of the present disclosure. The read operation in FIG. 9 includes steps S110 to S150. In the step S110, refer to the mark (1) in FIG. 7. The above-mentioned processing circuit 215 obtains the mapping group identification MGID according to the namespace identification NSID and the logical address LA through the namespace-table NST.

Next, in the step S120, refer to the mark (2) in FIG. 7. The above-mentioned processing circuit 215 obtains the block group identification BGID and the mapping entry ME according to the mapping group identification MGID and the offset of the logical address LA in the mapping group identification MGID through the logical-to-virtual-mapping-table L2VMT. The virtual address VA corresponding to the mapping entry ME records the channel CH, the die DE, the plane PL and the virtual block number VBN.

Then, in the step S130, refer to the mark (3) in FIG. 8. The processing circuit 215 obtains the super block identification SBID according to the block group identification BGID and the virtual block number VBN through the virtual-to-physical-block-table V2PBT.

Afterwards, in the step S140, refer to the mark (4) in FIG. 8. The processing circuit 215 obtains the physical block number PBN according to the super block identification SBID, the channel CH, the die DE and the plane PL through the virtual-to-physical-block-table V2PBT.

Next, in the step S150, the memory cell array 220 is accessed according to the channel CH, the die DE, the plane PL, the page PG, the block BLK and the physical block number PBN of the mapping entry ME, and the data is replied to the host 100.

The reading operation could be completed through the above-mentioned steps S110 to S150, but the above-mentioned steps S110 to S150 are not used to limit the application of the disclosed technology in the reading operation. The following further explains the application of the disclosed technology in the writing operation.

Figure 10:
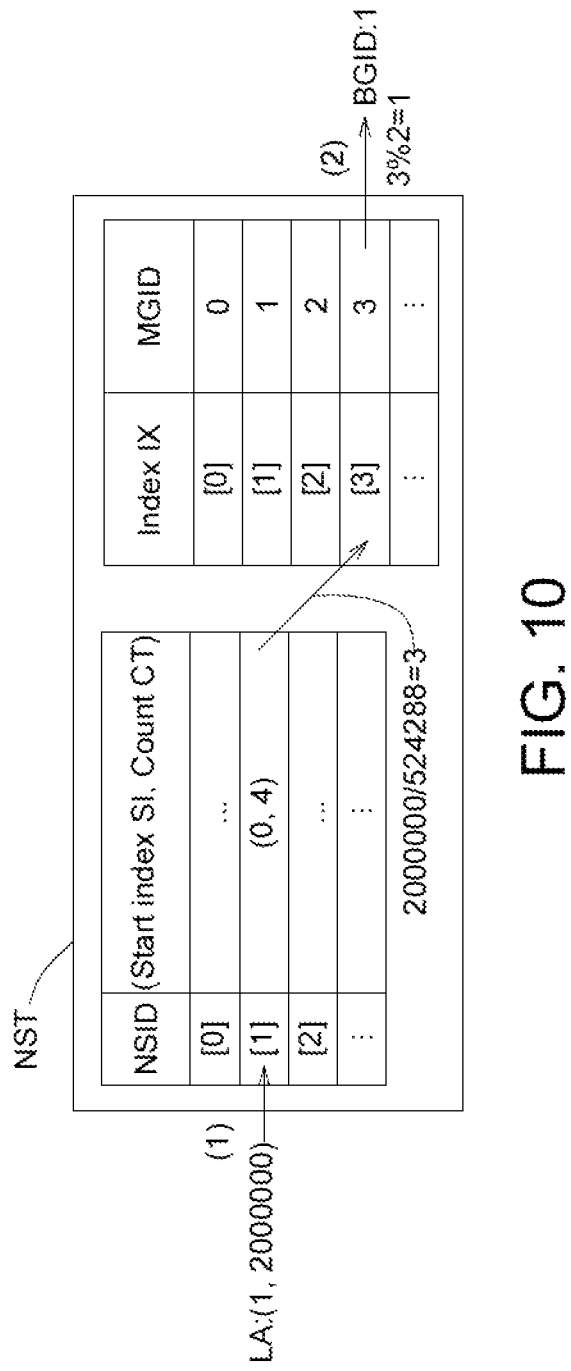
FIG. 10 illustrates the namespace-table NST used in the write operation.

Please refer to FIG. 10, which illustrates the namespace-table NST used in the write operation. In the example in FIG. 10, each of the coding numbers for the mapping group identification MGID maps to 524288 mapping entries ME, and maps to two coding numbers for the block group identification BGID.

The following is an example of writing data into the coding number "1" for the namespace identification NSID and the logical address LA is "2000000". Refer to the mark (1) in FIG. 10. In the namespace-table NST, the start index SI and the count CT mapped to the coding number "1" for the namespace identification NSID are 0 and 4 respectively. The indexes mapped to the coding number "1" for the namespace identification NSID are "0", "1", "2", "3" (i.e. the coding numbers "0", "1", "2", "3" for the mapping group identification MGID).

Each of the coding numbers for the mapping group identification MGID maps to 524288 mapping entries ME. The logical address LA is "2000000". After the division operation of 2000000/524288, the quotient of "3" could be obtained. That is to say, the logical address LA of "2000000" maps to the fourth mapping group identification MGID (i.e. the coding number "3" for the mapping group identification MGID).

Refer to the mark (2) in FIG. 10. The coding number "3" for the mapping group identification MGID is obtained. Through the modulus operation of 3% 2, "1" can be obtained. In other words, the coding number "3" for the mapping group identification MGID maps to the coding number "1" for the block group identification BGID.

Figure 11:
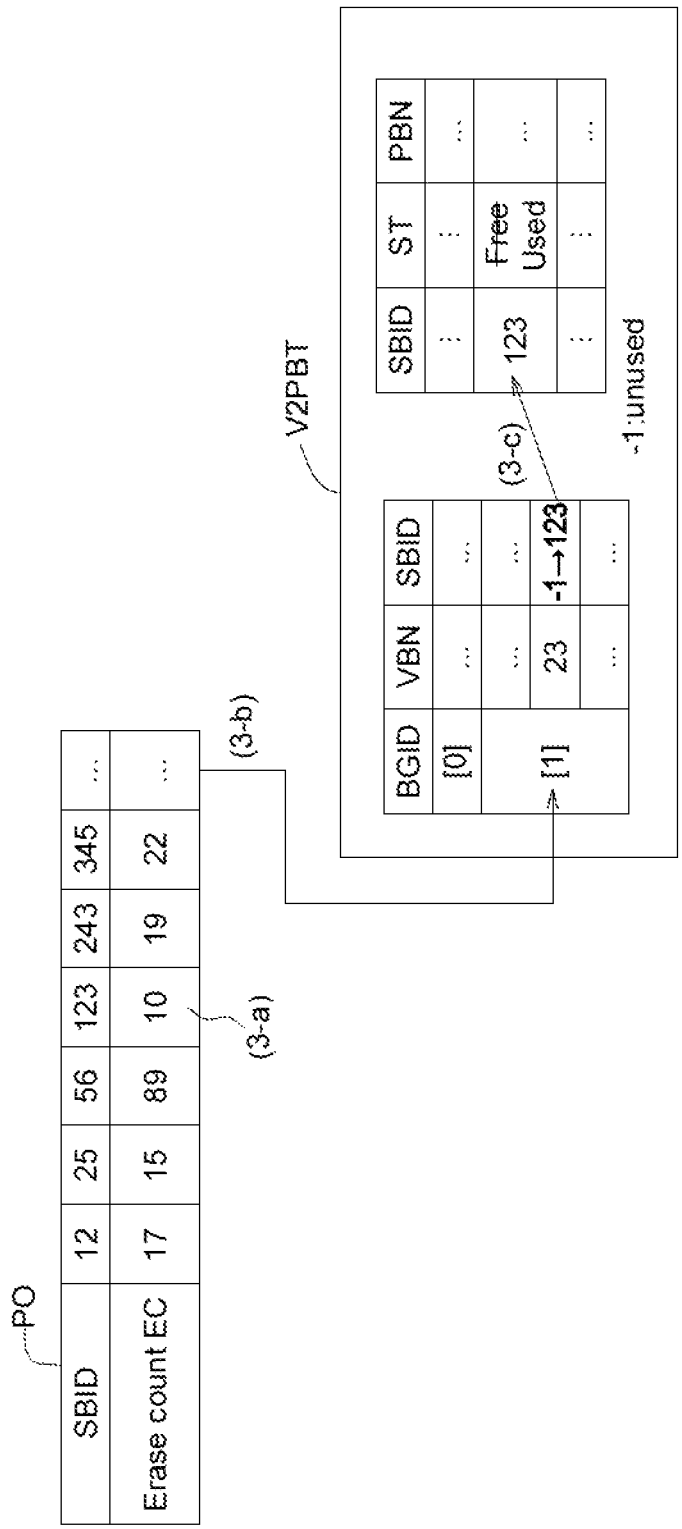
FIG. 11 illustrates the application of the virtual-to-physical-block-table V2PBT in the write operations.

Next, please refer to FIG. 11, which illustrates the application of the virtual-to-physical-block-table V2PBT in the write operations. Refer to the mark (3-a) in FIG. 11. One coding number for the super block identification SBID whose erase count EC is smallest in a free superblock pool PO (the coding numbers for the super block identification SBID whose state is "Free") is selected as an opened superblock. For example, the coding number "123" for the super block identification SBID with the smallest erase count EC of "10" is selected as the opened superblock.

Next, refer to mark (3-b) in FIG. 11. The virtual block number VBN that has not been paired to the super block identification SBID (corresponding to the coding number "−1") is selected from the coding number "1" for the block group identification BGID. For example, the coding number "23" for the virtual block number VBN is selected. In this step, the coding number "23" for the virtual block number VBN will be modified to map to the coding number "123" for the super block identification SBID.

Then, refer to the mark (3-c) in FIG. 11. The state ST of the coding number "123" for the selected super block identification SBID is changed to be "Used".

Figure 12:
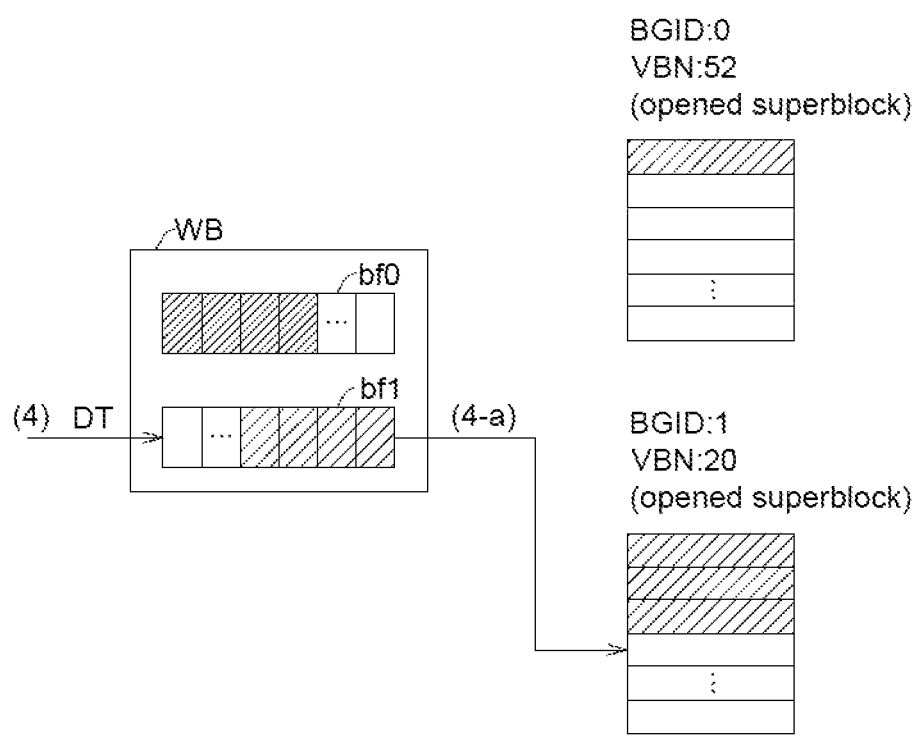
FIG. 12 illustrates the application of a buffer device WB in the write operation.

Next, please refer to FIG. 12, which illustrates the application of a buffer device WB in the write operation. For example, the buffer device WB includes buffer areas bf0, bf1. The buffer area bf0 corresponds to the coding number "0" for the block group identification BGID, and the buffer area bf1 corresponds to the coding number "1" for the block group identification BGID.

Refer to mark (4) in FIG. 12. The data DT to be written is received from host 100 (shown in FIG. 1). Since the logical address LA is mapped to coding number "1" for the block group identification BGID, the data DT to be written will be stored in the buffer area bf1.

Next, refer to the mark (4-a) in FIG. 12. When the buffer device WB has been filled with a predetermined amount of data (for example, a page), the data will be written from the buffer device WB to the open superblock in the coding number "1" for the block group identification BGID. For example, the opened superblock is mapped to the coding number "20" for the virtual block number VBN.

Figure 13:
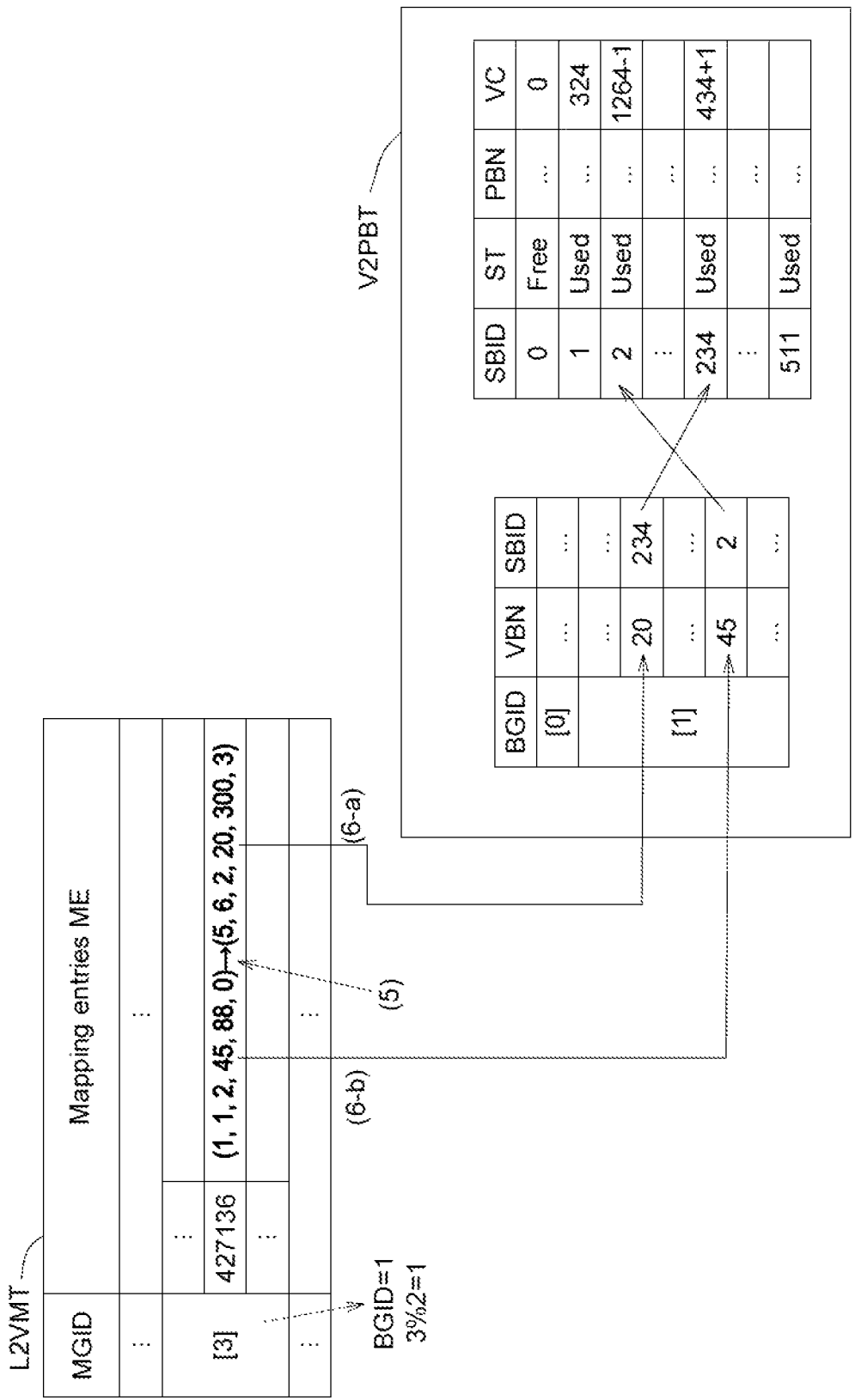
FIG. 13 illustrates the application of the logical-to-virtual-mapping-table and L2VMT the virtual-to-physical-block-table V2PBT during the write operation.

Then, please refer to FIG. 13, which illustrates the application of the logical-to-virtual-mapping-table L2VMT and the virtual-to-physical-block-table V2PBT during the write operation. Refer to mark (5) in FIG. 13. The logical address LA of "2000000" maps to the 427136th mapping entry ME in the coding number "3" for the mapping group identification MGID. The 427136th mapping entry ME in the coding number "3" for the mapping group identification MGID originally maps to the virtual address VA of "(1, 1, 2, 45, 88, 0)". According to the address written above, the 427136th mapping entry ME in the coding number "3" for the mapping group identification MGID will be changed to the virtual address VA of "(5, 6, 2, 20, 300, 3)".

Next, refer to the mark (6-a) in FIG. 13. The coding number "1" for the block group identification BGID and the coding number "20" for the virtual block number VBN map to the coding number "234" for the super block identification SBID through the virtual-to-physical-block-table V2PBT. The valid count VC of the coding number "234" for the super block identification SBID will be increased by 1. Refer to the mark (6-b) in FIG. 13. The coding number "1" for the block group identification BGID and the coding number "45" for the virtual block number VBN map to the coding number "2" for the super block identification SBID through the virtual-to-physical-block-table V2PBT. The valid count VC of the coding number "2" for the super block identification SBID will be reduced by 1.

According to the above description, through the technology of the present disclosure, during the write operation of the memory cell array 220 with a capacity of 16 TB (or higher), 32 bits can still be used for addressing without increasing the addressing bits. The following uses a flow chart to illustrate the writing operation of the present disclosure.

Figure 14:
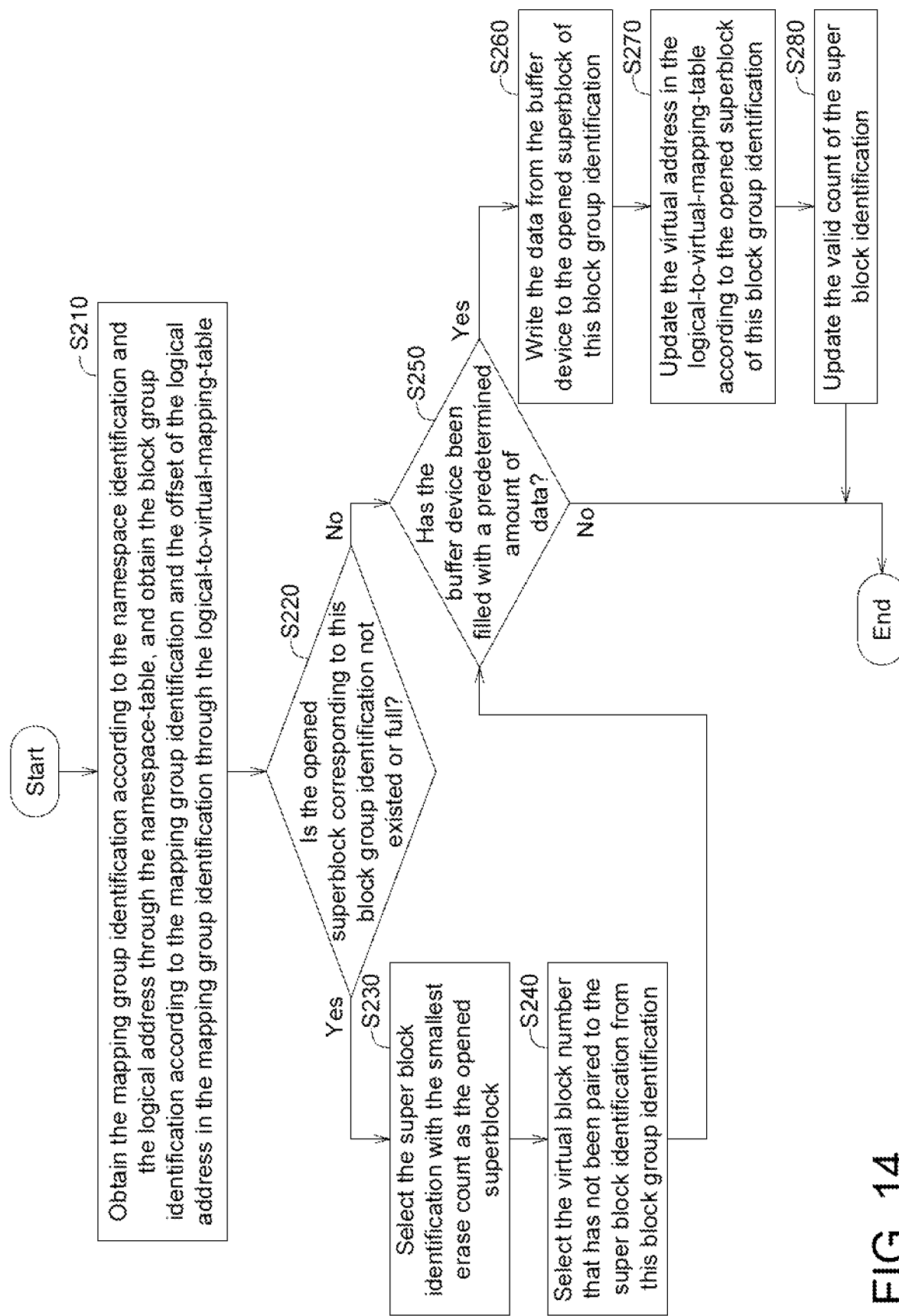
FIG. 14 illustrates a flow chart of the write operation according to an embodiment of the present disclosure.

Please refer to FIG. 14, which illustrates a flow chart of the write operation according to an embodiment of the present disclosure. The write operation in the FIG. 14 includes steps S210 to S280. In the step S210, refer to the marks (1) and (2) in FIG. 10. The above processing circuit 215 obtains the mapping group identification MGID according to the namespace identification NSID and the logical address LA through the namespace-table NST, and obtains the block group identification BGID according to the mapping group identification MGID and the offset of the logical address LA in the mapping group identification MGID through the logical-to-virtual-mapping-table L2VMT.

Next, in the step S220, whether the opened superblock corresponding to this block group identification BGID is not existed or is full is determined. If the opened superblock corresponding to this block group identification BGID is not existed or is full, then the process proceeds to the step S230; if the open superblock corresponding to this block group identification BGID is existed and is not full, then the process proceeds to the step S250.

In the step S230, refer to the mark (3-a) in FIG. 11. The super block identification SBID with the smallest erase count EC is selected as the opened superblock.

Then, in the step S240, refer to the mark (3-b) in FIG. 11. The virtual block number VBN that has not been paired to the super block identification SBID is selected from this block group identification BGID. At this time, referring to the mark (3-c) in FIG. 11, the state ST of the selected super block identification SBID will be changed to be "Used".

Next, in the step S250, refer to the mark (4) in FIG. 12. Whether the buffer device WB has been filled with a predetermined amount of data (for example, a page) is determined. If the buffer device WB has been filled with a predetermined amount of data, then the process proceeds to the step S260.

In the step S260, refer to the mark (4-a) in FIG. 12. The data is written from the buffer device WB to the opened superblock of this block group identification BGID.

Next, in the step S270, refer to the mark (5) in FIG. 12. The virtual address VA in the logical-to-virtual-mapping-table L2VMT is updated according to the opened superblock of this block group identification BGID.

Then, in the step S280, refer to the marks (6-a) and (6-b) in FIG. 12. The valid count VC of the super block identification SBID is updated.

The writing operation could be completed through the above steps S210 to S280, but the above steps S210 to S280 are not used to limit the application of the disclosed technology in the writing operation. The application of the disclosed technology in the garbage collection is further explained below.

Figure 15:
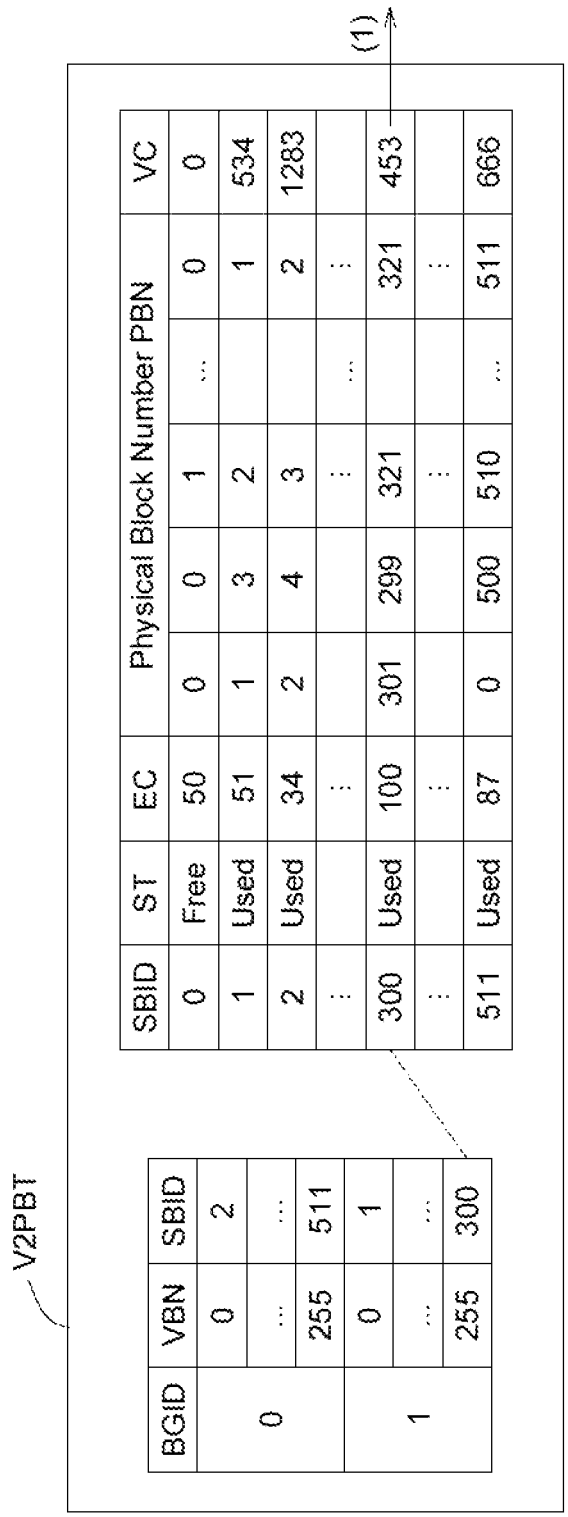
FIG. 15 illustrates the application of the virtual-to-physical-block-table V2PBT during the garbage collection.

Please refer to FIG. 15, which illustrates the application of the virtual-to-physical-block-table V2PBT during the garbage collection. Referring to the mark (1) in FIG. 15. Within a certain block group identification BGID, the one whose state ST is "Used" and has the lowest valid count VC is selected as the victim superblock. For example, the virtual block number VBN (or the super block identification SBID) whose state ST is "Used" and valid count VC is "453" is selected as the victim superblock.

Figure 16:
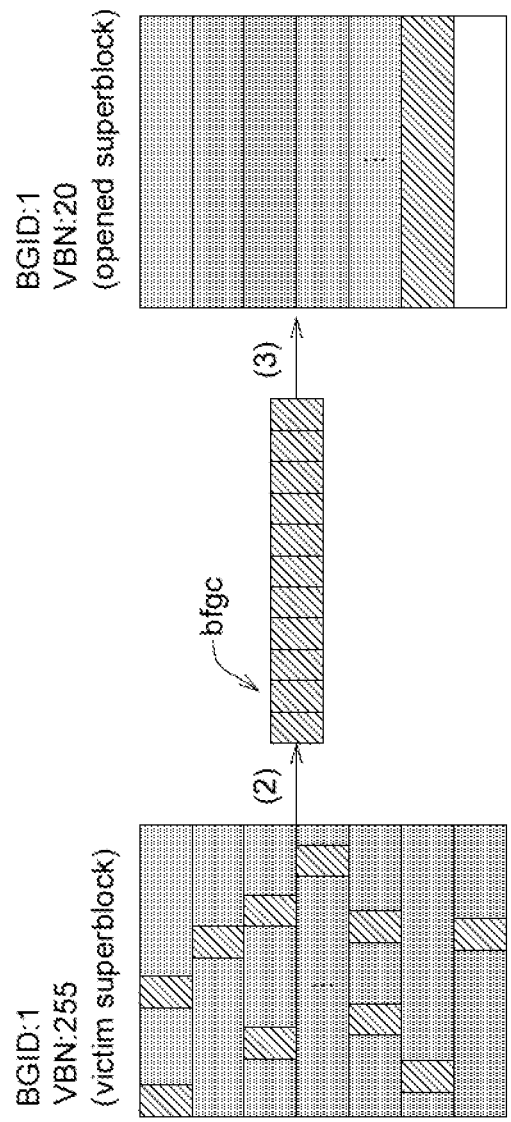
FIG. 16 illustrates the application of the buffer area bfgc during the garbage collection.

Next, please refer to FIG. 16, which illustrates the application of the buffer area bfgc during the garbage collection. Refer to mark (2) in FIG. 16. The valid data from the victim superblock is read to the buffer area bfgc.

Then, refer to the mark (3) in FIG. 16. When the buffer area bfgc has been filled with a predetermined amount of data (for example, a page), the data will be written from the buffer area bfgc to the opened superblock in the coding number "1" for the block group identification BGID. The opened superblock is, for example, the coding number "20" for the virtual block number VBN.

Figure 17:
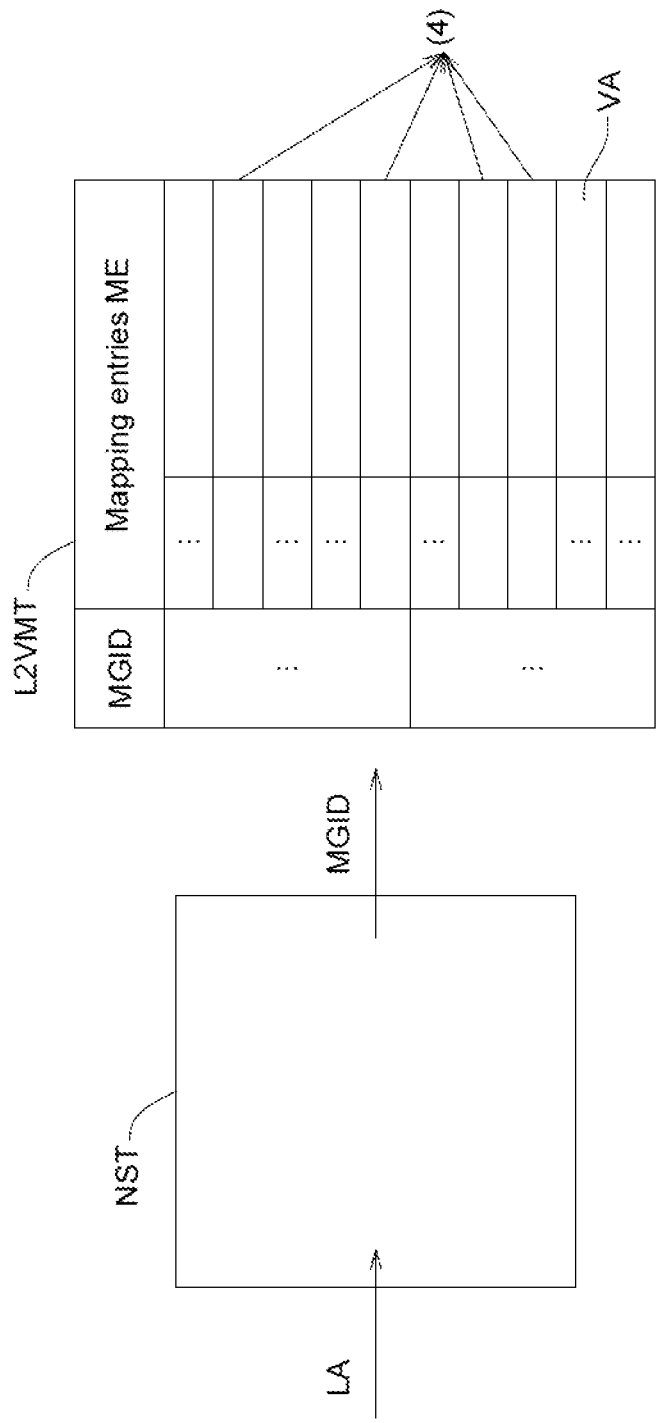
FIG. 17 illustrates the application of the namespace-table NST and the logical-to-virtual-mapping-table L2VMT during the garbage collection.

Next, please refer to FIG. 17, which illustrates the application of the namespace-table NST and the logical-to-virtual-mapping-table L2VMT during the garbage collection. Refer to mark (4) in FIG. 17. The virtual address VA of the logical-to-virtual-mapping-table L2VMT is updated according to the moved data.

Then, please refer to FIG. 18, which illustrates the application of the namespace-table NST and the virtual-to-physical-block-table V2PBT during the garbage collection. Refer to the mark (5) in FIG. 18. The state and the valid count VC of the coding number "300" for the super block identification SBID which is selected as the victim superblock are changed to be "Free" and "0". At the same time, the coding number "300" for the super block identification SBID is added to the free superblock pool PO.

According to the above description, through the technology of the present disclosure, during the garbage collection of the memory cell array 220 with a capacity of 16 TB (or higher), 32 bits can still be used for addressing without increasing the addressing bits. The following uses a flow chart to illustrate the garbage collection of the present disclosure.

Figure 19:
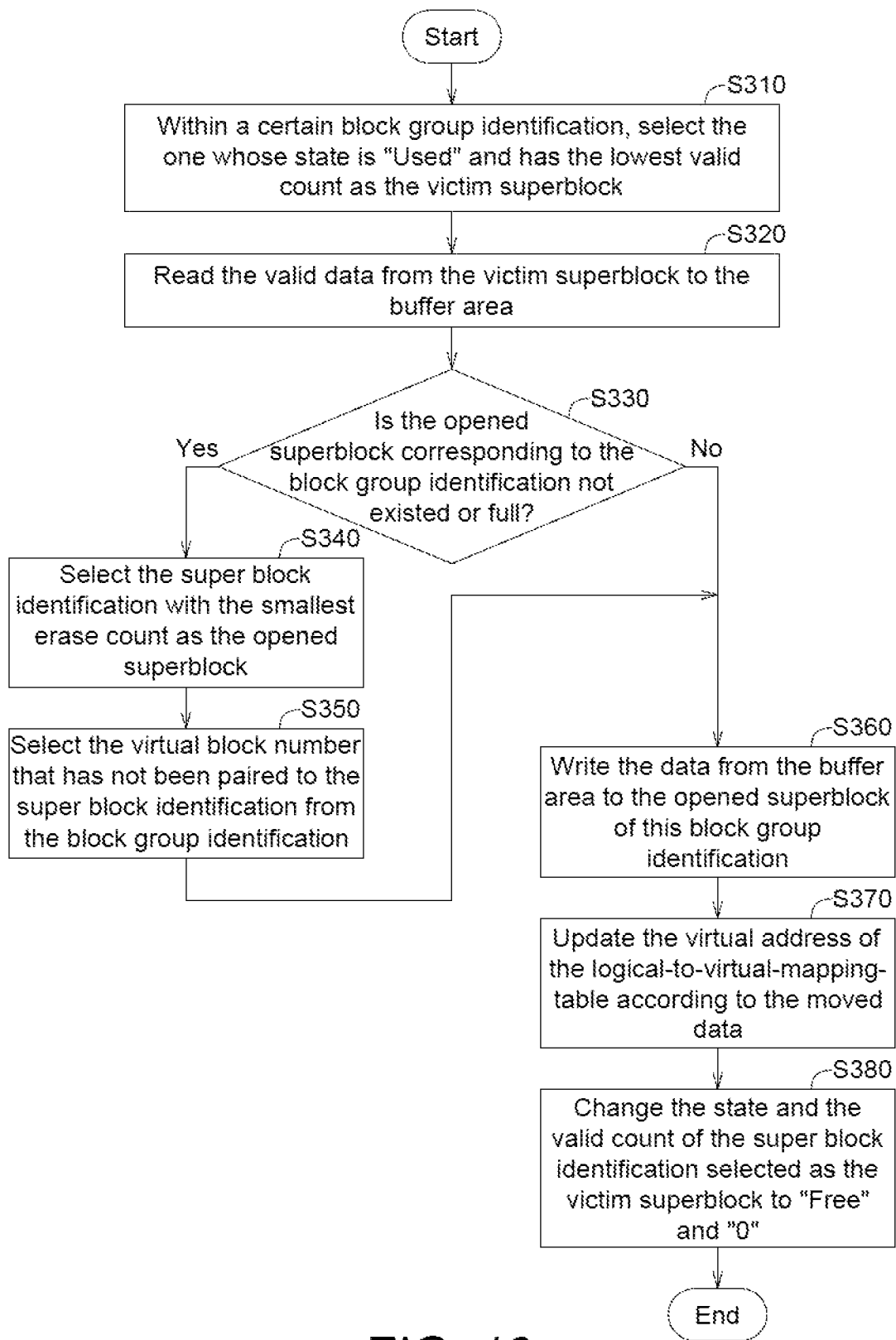
FIG. 19 illustrates a flow chart of the garbage collection according to an embodiment of the present disclosure.

Please refer to FIG. 19, which illustrates a flow chart of the garbage collection according to an embodiment of the present disclosure. The garbage collection operation in FIG. 19 includes steps S310 to S380. In the step S310, refer to the mark (1) in FIG. 15. Within a certain block group identification BGID, the one whose state is "Used" and has the lowest valid count VC is selected as the victim superblock.

Next, in the step S320, refer to mark (2) in FIG. 16. The valid data is read from the victim superblock to the buffer area bfgc.

Then, in the step S330, whether the opened superblock corresponding to the block group identification BGID is not existed or is full is determined. If the opened superblock corresponding to the block group identification BGID is not existed or is full, then the process proceeds to the step S340; if the opened superblock corresponding this block group identification BGID is existed and is not full, then the process proceeds to the step S360.

In the step S340, the super block identification SBID with the smallest erase count EC is selected as the opened superblock.

Then, in the step S350, the virtual block number VBN that has not been paired to the super block identification SBID is selected from the block group identification BGID. At this time, the state ST of the selected super block identification SBID will be changed to "Used".

Then, in the step S360, refer to the mark (3) in FIG. 16. The data is written from the buffer area bfgc to the opened superblock of this block group identification BGID.

Next, in the step S370, refer to the mark (4) in FIG. 17. The virtual address VA of the logical-to-virtual-mapping-table L2VMT is updated according to the moved data.

Then, in the step S380, refer to mark (5) in FIG. 18. The state ST and the valid count VC of the super block identification SBID selected as the victim superblock is changed to "Free" and "0".

The garbage collection could be completed through the above steps S310 to S380, but the above steps S310 to S380 are not used to limit the application of the disclosed technology in the garbage collection.

Figure 20:
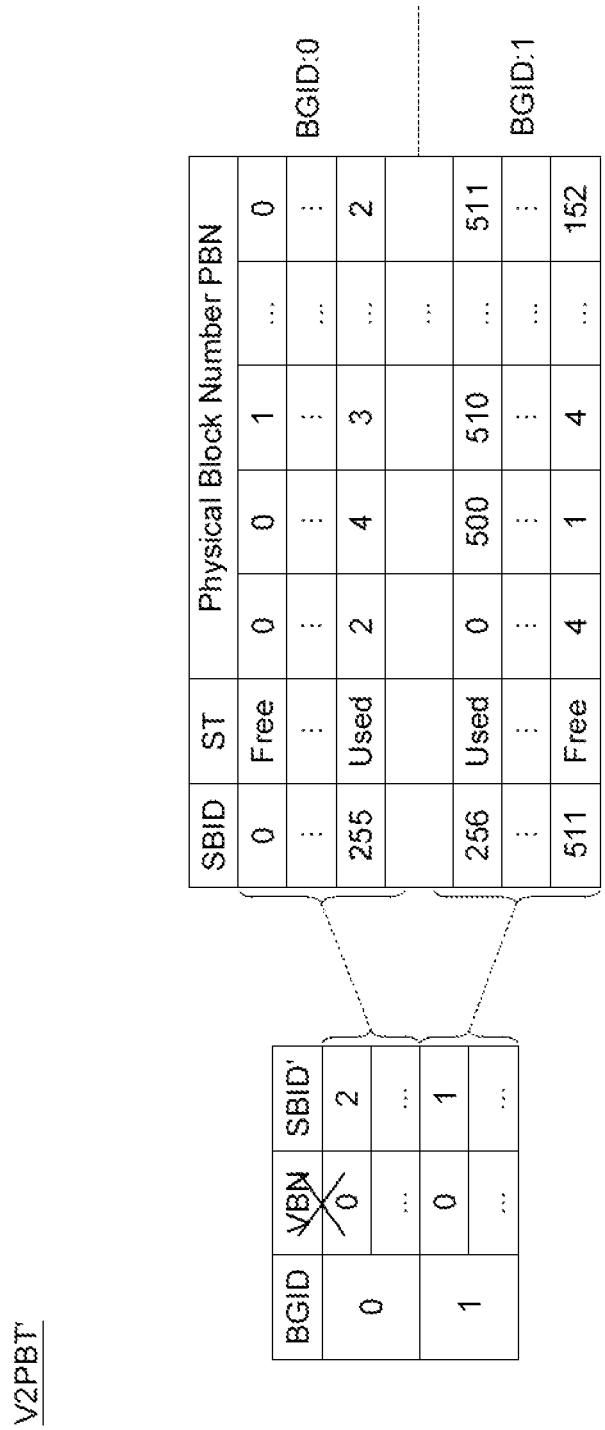
FIG. 20 illustrates a virtual-to-physical-block-table V2PBT' according to another embodiment of the present disclosure.

Please refer to FIG. 20, which illustrates a virtual-to-physical-block-table V2PBT' according to another embodiment of the present disclosure. In another embodiment, the virtual block number VBN may not be used. In the virtual-to-physical-block-table V2PBT' of this embodiment, one coding number for the block group identification BGID maps to a plurality of coding numbers for the superblock identification offset SBID'. For example, the coding number "0" for the block group identification BGID maps to the coding numbers "0" to "255" for the superblock identification offset SBID'; the coding number "1" for the block group identification BGID maps to the coding numbers "0" to "255" for the superblock identification offset SBID'.

Through the design of the virtual-to-physical-block-table V2PBT', the above processing circuit 215 could obtain the physical block number PBN according to the block group identification BGID, the superblock identification offset SBID', the channel CH, the die DE and the plane PL through the virtual-to-physical-block-table V2PBT'.

According to the above embodiment, through the operation of the namespace-table NST, the logical-to-virtual-mapping-table L2VMT and the virtual-to-physical-block-table V2PBT, the memory cell array 220 with a capacity of 16 TB (or higher) could use the 32-bit virtual address VA without increasing the number of addressing bits or reducing writing efficiency.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A memory control circuit, used for controlling a memory cell array, wherein the memory control circuit comprises:
   a storage unit, configured to store a namespace-table, a logical-to-virtual-mapping-table and a virtual-to-physical-block-table; and
   a processing circuit, connected to the storage unit;
   wherein the processing circuit is configured to;
   obtain a mapping group identification according to a namespace identification and a logical address through the namespace-table;
   obtain a block group identification and one of a plurality of mapping entries according to the mapping group identification and an offset of the logical address in the mapping group identification through the logical-to-virtual-mapping-table, wherein the offset is a remainder of dividing the logical address by a number of the plurality of mapping entries corresponding to the mapping group identification; and
   obtain a physical block number through the virtual-to-physical-block-table.

2. The memory control circuit according to claim 1, wherein in the virtual-to-physical-block-table, a coding number for the block group identification maps to a plurality of coding numbers for a superblock identification offset.

3. A memory control circuit, used for controlling a memory cell array, wherein the memory control circuit comprises:
   a storage unit, used for storing a namespace-table, a logical-to-virtual-mapping-table and a virtual-to-physical-block-table; and
   a processing circuit, connected to the storage unit;
   wherein the processing circuit is configured to:
   obtain a mapping group identification according to a namespace identification and a logical address through the namespace-table;
   obtain a block group identification and one of a plurality of mapping entries according to the mapping group identification and an offset of the logical address in the mapping group identification through the logical-tovirtual-mapping-table, wherein the offset is a remainder of dividing the logical address by a number of the plurality of mapping entries corresponding to the mapping group identification;

obtain a super block identification according to the block group identification and a virtual block number through the virtual-to-physical-block-table; and obtain a physical block number through the virtual-to-physical-block-table.

4. The memory control circuit according to claim 3, wherein the memory cell array has a capacity of 8 or more TB, and a number of the block group identification is determined by the capacity of the memory cell array.

5. The memory control circuit according to claim 1, wherein the physical block number is obtained according to the super block identification, a channel, a die and a plane through the virtual-to-physical-block-table.

6. The memory control circuit according to claim 1, wherein in the virtual-to-physical-block-table, a coding number for the block group identification maps to a plurality of coding numbers for the virtual block number, and each of the coding numbers for the virtual block number maps a coding number for the super block identification.

7. The memory control circuit according to claim 1, wherein in the logical-to-virtual-mapping-table, a plurality of coding numbers for the mapping group identification map to a plurality of coding numbers for the block group identification in a round robin policy.

8. The memory control circuit according to claim 1, wherein in the logical-to-virtual-mapping-table, N continuous coding numbers of the mapping group identification are mapped to an identical coding number of the block group identification.

9. The memory control circuit according to claim 1, wherein the memory cell array has a capacity of $2^N*8$ TB, and a number of addressing bits is 32 bits.

10. The memory control circuit according to claim 1, wherein in the namespace-table, a coding number for the namespace identification maps to one or more coding numbers for the mapping group identification.

11. The memory control circuit according to claim 1, wherein a coding number for the mapping group identification maps to a coding number for the block group identification.

12. A memory device, comprising:
a memory cell array; and
a memory control circuit, used for controlling the memory cell array, wherein the memory control circuit comprises:
  a storage unit, configured to store a namespace-table, a logical-to-virtual-mapping-table and a virtual-to-physical-block-table; and
  a processing circuit, connected to the storage unit;
wherein the processing circuit is configured to;
  obtain a mapping group identification according to a namespace identification and a logical address through the namespace-table;
  obtain a block group identification and one of a plurality of mapping entries according to the mapping group identification and an offset of the logical address in the mapping group identification through the logical-to-virtual-mapping-table, wherein the offset is a remainder of dividing the logical address by a number of the plurality of mapping entries corresponding to the mapping group identification;
  obtain a super block identification according to the block group identification and a virtual block number through the virtual-to-physical-block-table; and
  obtain a physical block number through the virtual-to-physical-block-table.

13. The memory device according to claim 12, wherein the memory cell array has a capacity of 8 or more TB, and a number of the block group identification is determined by the capacity of the memory cell array.

14. The memory device according to claim 12, wherein the physical block number is obtained according to the super block identification, a channel, a die and a plane through the virtual-to-physical-block-table.

15. The memory device according to claim 12, wherein in the virtual-to-physical-block-table, a coding number for the block group identification maps to a plurality of coding numbers for the virtual block number, and each of the coding numbers of the virtual block number maps to a coding number for the super block identification.

16. The memory device according to claim 12, wherein in the logical-to-virtual-mapping-table, a plurality of coding numbers for the mapping group identification map to a plurality of coding numbers for the block group identification in a round robin policy.

17. The memory device according to claim 12, wherein in the logical-to-virtual-mapping-table, N continuous coding numbers of the mapping group identification are mapped to an identical coding number of the block group identification.

18. The memory device according to claim 12, wherein the memory cell array has a capacity of $2^N*8$ TB, and a number of addressing bits is 32 bits.

19. The memory device according to claim 12, wherein in the namespace-table, a coding number for the namespace identification maps to one or more coding numbers for the mapping group identification.

20. The memory device according to claim 12, wherein a coding number for the mapping group identification maps to a coding number for the block group identification.

* * * * *